(12) United States Patent
Küther

(10) Patent No.: US 6,241,491 B1
(45) Date of Patent: Jun. 5, 2001

(54) DEVICE FOR SUPPLYING AN APPORTIONED MINIMUM AMOUNT OF FLUID

(75) Inventor: Ludwig Küther, Waldenbuch (DE)

(73) Assignee: J. Lorch Gesellschaft & Co. GmbH Gesellschaft fur Maschinen und Einrichtungen, Waldenbuch (DE)

( * ) Notice: Subject to any disclaimer, the term of this patent is extended or adjusted under 35 U.S.C. 154(b) by 0 days.

(21) Appl. No.: 09/147,629

(22) PCT Filed: Aug. 4, 1997

(86) PCT No.: PCT/EP97/04231

§ 371 Date: Jun. 21, 1999

§ 102(e) Date: Jun. 21, 1999

(87) PCT Pub. No.: WO98/06971

PCT Pub. Date: Feb. 19, 1998

(30) Foreign Application Priority Data

| Aug. 4, 1996 | (DE) | 296 13 444 U |
| Feb. 25, 1997 | (DE) | 197 07 400 |
| Feb. 25, 1997 | (DE) | 297 03 317 U |

(51) Int. Cl.[7] .................................................. F04B 53/12
(52) U.S. Cl. ............................................ 417/553; 417/570
(58) Field of Search ............................ 417/503, 502, 417/225, 242, 250, 493, 508, 553, 570

(56) References Cited

U.S. PATENT DOCUMENTS

| 1,994,173 | 3/1935 | Farmer . | |
| 3,091,254 | 5/1963 | Kilayko . | |
| 3,216,359 | * 11/1965 | Teichert | 103/41 |
| 3,680,985 | 8/1972 | Ginsberg et al. . | |
| 3,841,438 | 10/1974 | Tine et al. . | |
| 5,577,896 | * 11/1996 | Harada | 417/259 |
| 5,746,111 | * 5/1998 | Mueller et al. | 92/168 |
| 6,042,350 | * 3/2000 | Beck | 417/549 |

FOREIGN PATENT DOCUMENTS

| 1128711 | 4/1962 | (DE) . |
| 2651133 | 5/1977 | (DE) . |
| 2741803 | 3/1979 | (DE) . |
| 2425109C2 | 10/1985 | (DE) . |
| 4319098A1 | 12/1993 | (DE) . |
| 3818802C2 | 5/1994 | (DE) . |
| 19532566C1 | 10/1996 | (DE) . |
| 296 13 444 U1 | 10/1996 | (DE) . |
| 0246178A2 | 11/1987 | (EP) . |
| 2083141A | 3/1982 | (GB) . |
| 2179406A | 3/1987 | (GB) . |
| 2261919A | 6/1993 | (GB) . |

* cited by examiner

Primary Examiner—Charles G. Freay
Assistant Examiner—Ehud Gartenberg
(74) Attorney, Agent, or Firm—Jones, Tullar & Cooper, P.C.

(57) ABSTRACT

The invention relates to a pulse-triggered device for supplying an apportioned minimum amount of fluid, particularly oil for lubricating pneumatic systems. A valve actuated positive-displacement member may be moved using a pulse-triggered device located inside of a positive-displacement chamber, through which the fluid is supplied from a feeding channel to a discharge channel. A valve body, separate from the positive-displacement member is subjected to spring tension and may be lifted away from a valve seat connecting the two channels.

20 Claims, 2 Drawing Sheets

DEVICE FOR SUPPLYING AN APPORTIONED MINIMUM AMOUNT OF FLUID

FIELD OF THE INVENTION

The present invention relates to A device for supplying an apportioned minimum amount of fluid, especially oil for lubricating pneumatically actuated systems.

BACKGROUND OF THE INVENTION

The device of the present invention has a positive-displacement chamber, a tappetlike positive-displacement member displaceable therein, and a feeding channel discharging into the positive-displacement chamber; A check valve for the hydraulic disconnection of a portion of the positive-displacement chamber that is at pumping pressure from a feeding channel is provided, and a discharge channel, leading away from the positive-displacement chamber and discharging into a drop opening; The discharge channel can be closed off sealingly from the positive-displacement chamber by a valve prestressed in the closing direction and counter to the pump direction, and the tappetlike positive-displacement member is movable by a pulse-controlled actuating device in the positive-displacement chamber, as a result of which fluid is pumped from the feeding channel to the discharge channel. A valve body of the valve is embodied as a structural component which is separate from the positive-displacement member and is subject to spring tension, and can be lifted from its valve seat without being touched by the positive-displacement member as the positive-displacement member moves into the positive-displacement chamber, so that during this process a fluid volume equivalent to the positively displaced volume is pumped past the valve body into the discharge channel, and once a terminal position of the positive-displacement member is reached the valve body is again pressed against its valve seat.

From German Patent a DE 43 19 098 A1, an oil pump for supplying lubricant to an internal combustion engine is known whose fundamental design is equivalent to that described above. However, in such oil pumps, much larger quantities of fluid are pumped.

From German Patent, DE 195 32 566 C1, and European Patent, EP 0 246 178 A2, devices for apportioned pumping of a minimum quantity of oil for lubricating pneumatically actuated systems are known. However, these devices have the disadvantage that when the positive-displacement member moves, a hydraulic communication or pressure communication exists between the feeding channel, acted upon by pumping pressure, and the discharge channel that leads to a drip opening. The oil quantity required therefore depends on instantaneous pressure conditions, and the replicability or settability of the desired pumping quantity is not satisfactory.

SUMMARY OF THE PRESENT INVENTION

According to the present invention therefore during the intake stroke of the positive-displacement member, the discharge channel is closed off sealingly from the positive-displacement chamber by the valve that is prestressed counter to the feeding direction. During the supply stroke of the positive-displacement member, the valve that disconnects the positive-displacement chamber from the discharge channel is opened, without the positive-displacement member touching the valve body of the valve.

Between the pumping pulses, that is, when the positive-displacement member is in its terminal position, the aforementioned valve is closed whenever the pressure prevailing on the drip side, that is, in the flow channel, plus the spring pressure of the valve is greater than the pilot pressure prevailing on the feeding side. Pressure fluctuations in the flow channel, however, can cause the valve body, prestressed in the closing direction, to be lifted from its valve seat, so that during that time there is an undesired pressure communication between the feeding side and the discharge side, with the consequence of undefined states. It is, therefore, an object of the present invention to improve device of the type defined at the outset in such a way that the above disadvantages do not occur, and that the minimal quantity to be pumped can be specified or set in a precisely defined way.

In a device of this type, this object is attained according to the present invention in that the positive-displacement member, in its terminal position, can be pressed sealingly against an axial stop inside the positive-displacement chamber.

Because the positive-displacement member, in its terminal position is in sealing contact, secure sealing off of the positive-displacement chamber or feeding side from the discharge channel is assured even if there are pressure fluctuations in the flow channel, that is, on the discharge side. Furthermore, by the contact of the face end of the positive-displacement member with the axial stop, the minimal volume pumped per supply stroke can be set still more precisely than was previously the case.

To prevent impact or seating of the positivedisplacement displacement member onto or on the axial stop from causing irritating noise, the axial stop, or a face of the positive-displacement member, includes a nonmetallic noise-damping material. In each case it is assured that the positive-displacement member and the axial stop are embodied in complementary fashion to one another, so that in this terminal position of the positive-displacement member in contact with the stop secure sealing off of the positive-displacement chamber from the discharge channel is assured.

In a preferred embodiment of the present invention, the axial stop is formed by an element which also forms the valve seat of the valve that closes off the positive-displacement chamber from the discharge channel. The production and assembly costs are accordingly not increased by this provision according to the present invention.

The axial stop could be formed by an intrinsically arbitrary sealing seat in the broadest sense. It proves to be especially advantageous, and simple from a production standpoint, if the axial stop is made by an O-ring of an elastomeric sealing material. The O-ring can rest on an encompassing shoulder in a graduated opening, which defines the positive-displacement chamber.

If the O-ring at the same time protrudes radially inward past the smaller-diameter boundary of the graduated opening, then the valve body of the aforementioned valve that closes off the positive-displacement chamber from the discharge channel can be pressed against the O-ring as a sealing seat.

According to a further concept of the present invention, the O-ring is pressed against the encompassing shoulder by a bushing for the positive-displacement member, the bushing defining the positive-displacement chamber, and is thus kept in an installed position.

It is also proposed that the stroke height of the positive-displacement member relative to the axial stop inside the positive-displacement chamber be made settable, which can advantageously be attained by a stop means, which is adjustable in the axial direction, in the pulse-controlled actuating device.

If the check valve, which seals off a portion of the positive-displacement chamber that is at pumping pressure from the feeding side, is located relatively far away from the positive-displacement chamber, as is the case in known devices of the generic type in question, trapped air in the volume between the check valve and the positive-displacement chamber has a very negative effect and makes the pumping device harder to control and use. It thus proves to be advantageous if in accordance with a further concept of the present invention, which intrinsically has independent significance, the check valve is provided inside the positive-displacement chamber. As a result, the volume between the check valve and the positive-displacement chamber is reduced virtually to zero. The device of the present invention is simpler to control and use, because disruptive trapped air can no longer form between the positive-displacement chamber and the check valve, air that could be compressed and thus make the device more difficult to start up because the device would first have to be ventilated in a complicated way.

It is also proposed that the check valve be provided as a seal between the positive-displacement member and one wall of the positive-displacement chamber.

In a particularly advantageous way, the check valve includes a sealing element that can be placed against a sealing seat or lifted up from the sealing seat and is provided in floating fashion around the positive-displacement member. The sealing element is axially displaceable relative to the positive-displacement member and has radial play relative to the positive-displacement member. It rests against the wall of the positive-displacement chamber, providing radially outward sealing and is displaceable axially. The sealing element is intended to uncover a flow cross section in the intake stroke of the positive-displcement member and to close it in the supply stroke.

In a further refinement of the concept of the present invention, a sealing seat of the check valve is formed by the positive-displacement member itself. Advantageously, it has a circumferential groove in which the sealing element is received in floating fashion, and the side of the circumferential groove toward the feeding side forms the sealing seat for the sealing element. In the intake stroke of the positive-displacement member, the sealing element is listed from the sealing seat, so that the fluid to be pumped can pass between the wall of the positive-displacement chamber and pass the positive-displacement member from the feeding side into the circumferential groove and from there, via a recess in the positive-displacement member, to the pumping side of the positive-displacement member.

In a particularly preferred refinement of this concept of the present invention, the spacing of the sides that define the circumferential groove is only slightly greater than the thickness of the sealing element in this direction so that the check valve is essentially free of idle volume. At the transition from the intake stroke to the supply stroke of the positive-displacement member, in the course of the actuation of the positive-displacement member which takes only approximately 300 to 500 ms, an abrupt switchover is made from the intake operating position to the pumping or positive-displacement operating position, in that the sealing element of the check valve is immediately pressed into sealing contact with the side of the circumferential groove toward the feeding side.

To keep frictional forces in the entrained or relative motion of the sealing element relative to the wall of the positive-displacement chamber as slight as possible, it is proposed that a bushing for the positive-displacement member be inserted into the positive-displacement chamber, against which bushing the O-ring slides in sealing fashion, and which bushing preferably comprises PTFE or has a PTFE coating. This bushing can, as already noted at the outset, keep the element acting as a stop with its face end in an installed position.

Further characteristics, advantages and details of the present invention will become apparent from the appended claims and from the drawing and the ensuing description of two advantageous embodiments of the present invention.

DESCRIPTION OF THE PREFERRED EMBODIMENTS

Figure 1:
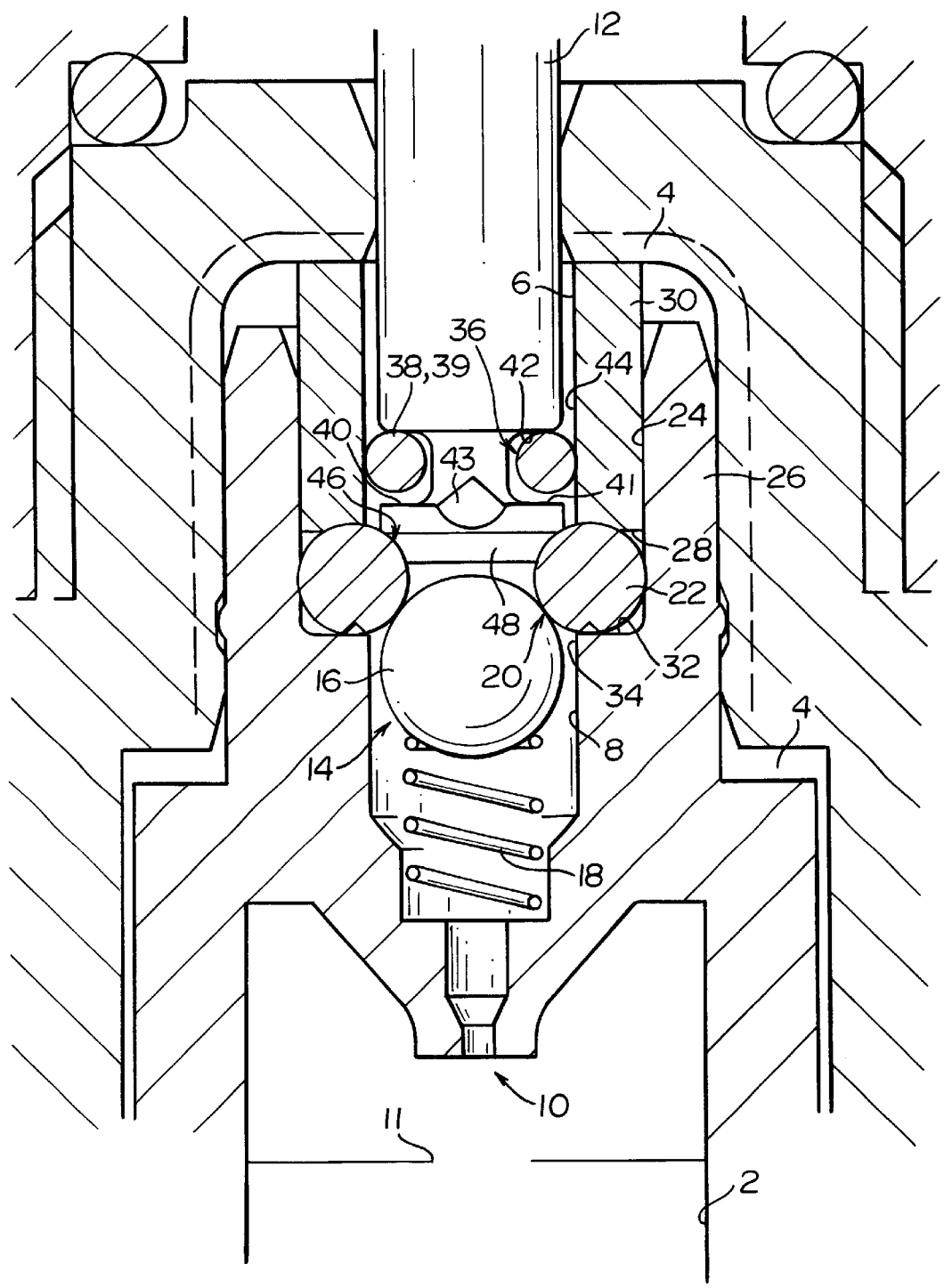
FIG. 1 is a fragmentary view of a device according to the present invention for apportioned pulse-controlled pumping of a minimal quantity of a fluid.

The drawings show details of a pumping device for pulse-controlled pumping of a minimum quantity of oil, for instance on the order of magnitude of 15 mm$^3$ per stroke, for lubricating pneumatically actuated systems, in which the oil is dispensed in the form of small droplets into compressed air flowing past in a compressed air channel 2. The oil to be pumped or to be metered precisely is fed via a feeding channel 4 from a reservoir, not shown, to a positive-displacement chamber 6. A discharge channel 8 leads away from the positive-displacement chamber 6 and discharges into a drip opening 10. Fluid dripping from drip opening 10 passes via an opening 11 into the compressed air channel 2 and is entrained and atomized by the working air flowing there.

For pumping or positively displacing fluid out of the positive-displacement chamber 6, a rodlike or tappet-shaped positive-displacement member 12 is provided, which extends upward into the positive-displacement chamber 6 and can be moved into and out of it. To that end, a pulse-controlled actuating device not shown in the drawing a is provided, which can move the positive-displacement member 12 electromagnetically, by an electric motor, or in some other way. The positive-displacement chamber 6 can be closed off from the discharge channel 8 by a valve identified overall by reference numeral 14. The valve 14 includes a spherical valve body 16, which can be pressed against a valve seat 20 or raised up from it in a prestressed fashion counter to the pumping direction and in the closing direction by a spring 18. The valve seat 20 is formed by a circular-annular sealing element 22, which is inserted into a graduated housing bore 24 of a domelike device housing part 26.

The circular-annular sealing element 22 is pressed, by the face end 28 of a bushing 30 inserted into the graduated bore 24, against an encompassing shoulder 32 of the graduated bore 24. In the radially inward direction, the circular-annular sealing element 22 protrudes past the wall 34 of the smaller-diameter portion of the bore 24 that at the same time forms the discharge channel 8, so that the valve body 16 can be pressed sealingly against it.

In order to connect the positive-displacement chamber 6 with the feeding channel 4 during the intake stroke of the positive-displacement member 12 and to disconnect it from the feeding channel 4 during the supply stroke, a check valve identified overall by reference numeral 36 is provided.

The check valve 36 is embodied between the positive-displacement member 12 and the bushing 30 and includes a sealing element 38 in the form of an O-ring 39 of an elastomeric sealing material. The O-ring 39 is provided in floating fashion in a circumferential groove 40 of the positive-displacement member 12. The O-ring 39 is accordingly displaceable in the axial direction and can be pressed against one or the other side 41, 42 of the circumferential groove 40.

In the intake stroke of the positive-displacement member 12, the flow cross section is uncovered by a recess 43, extending radially from the inside toward the outside, in the side 41 of the groove, and fluid can flow into the positive-displacement chamber 6 to replenish it via the feeding channel 4, circumferential groove 40, and recess 43. The sealing element 38 is entrained in the axial direction by the groove side 41.

Once the flow cross section is closed in the supply stroke of the positive-displacement member 12, the O-ring 39 rests sealingly both on the rear side 42 of the groove, in terms of the pumping direction, and on the wall 44 of the bushing 30, specifically by the action of the pumping pressure that arises in the supply stroke of the positive-displacement member 12.

The supply stroke of the positive-displacement member 12 is defined in the pumping direction by an axial stop 46. The axial stop 46 is formed by the circular-annular sealing element 22 of the valve 14 between the positive-displacement chamber 6 and the discharge channel 8. By means of the circular-annular sealing element 22, the impact of the free end 48 of the positive-displacement member 12 is damped, and no irritating noises ensue. In this terminal position, the positive-displacement member rests sealingly against the stop 46 and assures that the positive-displacement chamber will be securely sealed off from the discharge side even whenever the pressure in the feeding channel 2 drops, as a result of sudden pressure fluctuations, in such a way that the valve body 16 would be lifted from its valve seat 20 by the pilot pressure on the feeding side.

Figure 2:
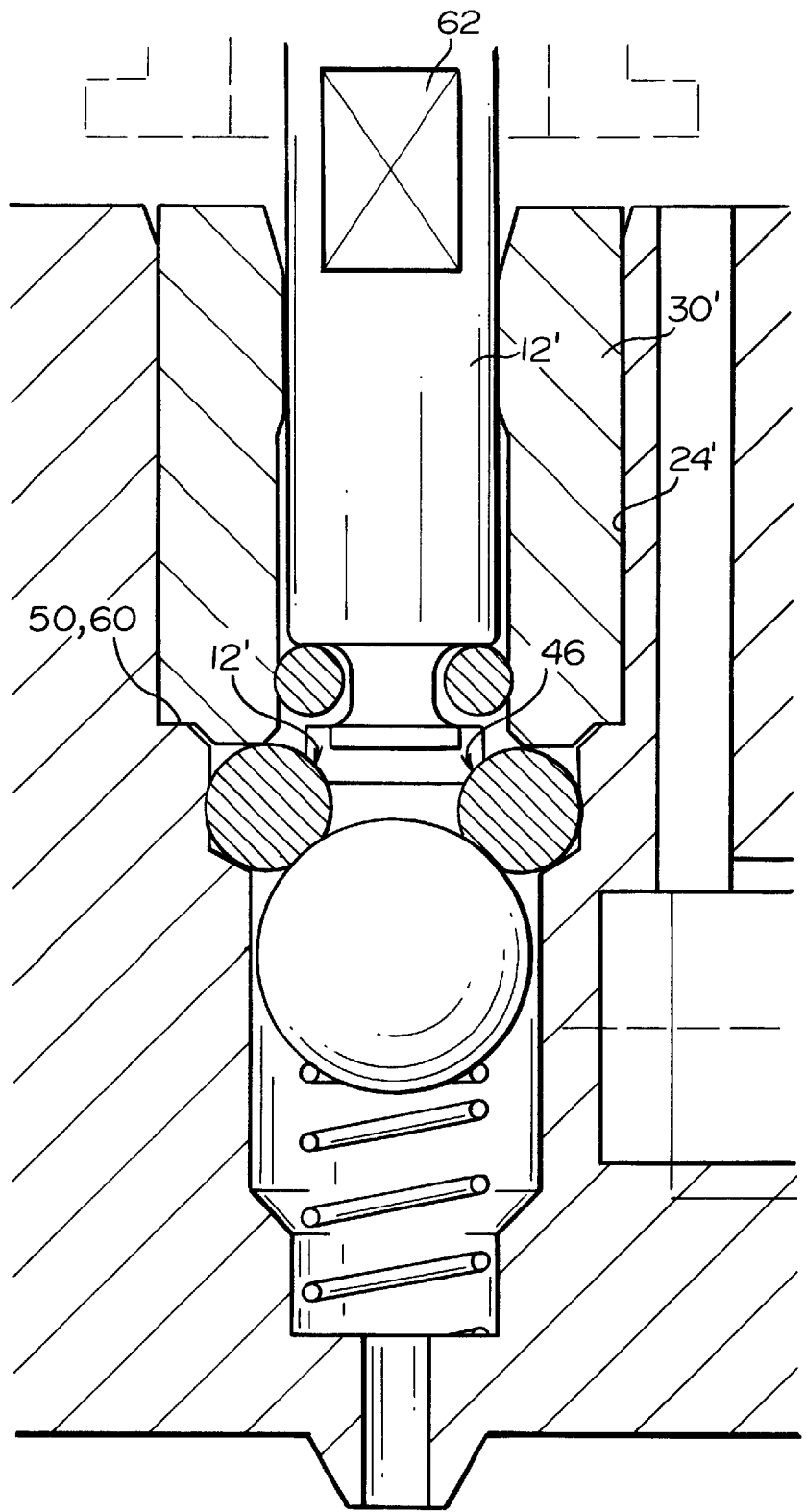
FIG. 2 is a fragmentary view of a further embodiment of the device according to the present invention.

FIG. 2 shows a further embodiment of the pumping device, in which the bore 24' has a further graduation 50, which has a defined installation stop 60 for the bushing 30'. An electromagnetic actuating device 62 is also shown in suggested fashion, whose stroke height can be set relative to the stop 46 of the positive-displacement member 12' and thus relative to the installation stop 60.

What is claimed is:

1. A device for supplying an apportioned minimum amount of fluid, especially oil for lubricating pneumatically actuated systems, comprising:

a tappetlike positive-displacement member;

a positive-displacement chamber defining therein an axial stop for said tappetlike positive-displacement member displaceable therein;

a feeding channel for the discharge of liquid to be apportioned into said positive-displacement chamber;

a check valve for the hydraulic disconnection of a portion of the positive-displacement chamber from said feeding channel;

a drip opening;

a discharge channel leading away from said positive-displacement chamber and discharging into said drip opening;

a valve for sealingly closing off said discharge channel from said positive-displacement chamber; and means for prestressing said valve in a closing direction, counter to the pump direction, wherein said positive-displacement member being moveable in said positive-displacement chamber by a pulse controlled actuating device, as a result of which fluid to be apportioned is pumped from said feeding channel to said discharge channel, said valve has a valve body embodied as a structural component separated from said positive-displacement member, is subject to spring tension, and is lifted from its valve seat without contact with said positive-displacement member as it moves into said positive-displacement chamber, so that during this movement a fluid flow volume equivalent to the positively displaced volume is pumped past said valve body into said discharge channel, and once a terminal position of said positive-displacement member is reached said valve body is pressed against its valve seat; and said positive-displacement member is pressed sealingly against said axial stop in its terminal position.

2. The device as defined in claim 1, further comprising:

a noise-damping material included on one of the face of said positive-displacement member and said axial stop.

3. The device as defined in claim 1, herein said axial stop is formed by an element which also forms the valve seat of said valve.

4. The device as defined in claim 1, wherein said axial stop is formed by an O-ring of an elastomeric sealing material.

5. The device as defined in claim 4, wherein a shoulder is defined between said positive-displacement chamber and said discharge channel, and wherein said O-ring is pressed against said shoulder.

6. The device as defined in claim 5, further comprising:
a bushing which defines said positive-displacement chamber, said bushing pushing said O-ring against said shoulder.

7. The device as defined in claim 1, wherein the front end of said positive-displacement member, oriented toward said axial stop, is embodied as frustoconically.

8. The device as defined in claim 1, wherein said pulse-controlled actuating device controls the stroke height of said positive-displacement member.

9. The device as defined in claim 8, wherein said pulse-controlled actuating device includes an axial stop means for mechanically setting said stroke height.

10. The device as defined in claim 1, wherein said check valve is situated within said positive-displacement chamber.

11. The device as defined in claim 10, wherein said check valve serves as a seal between said positive-displacement member and a wall of said positive-displacement chamber.

12. The device as defined in claim 10, wherein said check valve includes a sealing element which is placed against and lifted from a sealing seat provided in floating fashion around said positive-displacement member.

13. The device as defined in claim 12, wherein said sealing seat is formed by said positive-displacement member.

14. The device as defined in claim 12, wherein said positive-displacement member includes a circumferential groove in which said sealing element is received in a floating fashion, and wherein said sealing seat is formed by said circumferential groove toward the feeding side.

15. The device as defined in claim 14, wherein the sides defining said circumferential groove are spaced slightly greater than the thickness of said sealing element, thereby said check valve is essentially free of idle volume.

16. The device as defined in claim 12, wherein said sealing element comprises an O-ring of elastomeric sealing material.

17. The device as defined in claim 16, wherein said O-ring forming said sealing element has an inside diameter opening of 1 to 2 mm.

18. The device as defined in claim 16, wherein said O-ring forming said sealing element has a thickness of 0.8 to 1.3 mm in diameter.

19. The device as defined in claim 12, wherein said bushing is situated in said positive-displacement chamber, and wherein said sealing element rests sealingly and displaceably against said bushing.

20. The device as defined in claim 19, wherein said bushing comprises PTFE.

* * * * *